United States Patent
Bean et al.

(10) Patent No.: US 8,112,679 B2
(45) Date of Patent: Feb. 7, 2012

(54) DATA RELIABILITY BIT STORAGE QUALIFIER AND LOGICAL UNIT METADATA

(75) Inventors: Robert George Bean, Monument, CO (US); Clark Edward Lubbers, Colorado Springs, CO (US); Randy L. Roberson, New Port Richey, FL (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 12/626,183

(22) Filed: Nov. 25, 2009

(65) Prior Publication Data

US 2010/0131706 A1     May 27, 2010

Related U.S. Application Data

(63) Continuation of application No. 10/669,196, filed on Sep. 23, 2003, now abandoned.

(51) Int. Cl.
*G06F 11/00*      (2006.01)
(52) U.S. Cl. .......... 714/54; 714/6.22; 714/6.24; 714/52; 711/114
(58) Field of Classification Search .......... 714/6, 13, 714/15, 5, 52, 54; 711/114
See application file for complete search history.

(56) References Cited

U.S. PATENT DOCUMENTS

| | | | |
|---|---|---|---|
| 4,434,487 A | 2/1984 | Rubinson et al. | |
| 5,379,411 A * | 1/1995 | Morgan et al. | 714/6 |
| 5,774,643 A | 6/1998 | Lubbers et al. | |
| 5,826,001 A | 10/1998 | Lubbers et al. | |
| 5,933,592 A | 8/1999 | Lubbers et al. | |
| 6,161,192 A | 12/2000 | Lubbers et al. | |
| 6,880,060 B2 * | 4/2005 | Talagala et al. | 711/170 |
| 7,103,811 B2 * | 9/2006 | Talagala et al. | 714/718 |
| 7,873,878 B2 * | 1/2011 | Belluomini et al. | 714/52 |
| 2005/0044349 A1 * | 2/2005 | Henry | 713/150 |
| 2005/0066230 A1 * | 3/2005 | Bean et al. | 714/13 |

* cited by examiner

*Primary Examiner* — Philip Guyton
(74) *Attorney, Agent, or Firm* — Mitchell K. McCarthy

(57) ABSTRACT

Apparatus and associated method that stores first metadata only at the same addressable storage location of a computer readable medium as that where associated first user data is stored, and afterward satisfies a read request for the first user data by retrieving the first user data from the addressable location of the computer readable medium where the first metadata is stored if the first metadata has a first value, and by reconstructing the first user data from other metadata stored at another addressable location of the computer readable medium than where the first metadata is stored if the first metadata has a second value.

20 Claims, 7 Drawing Sheets

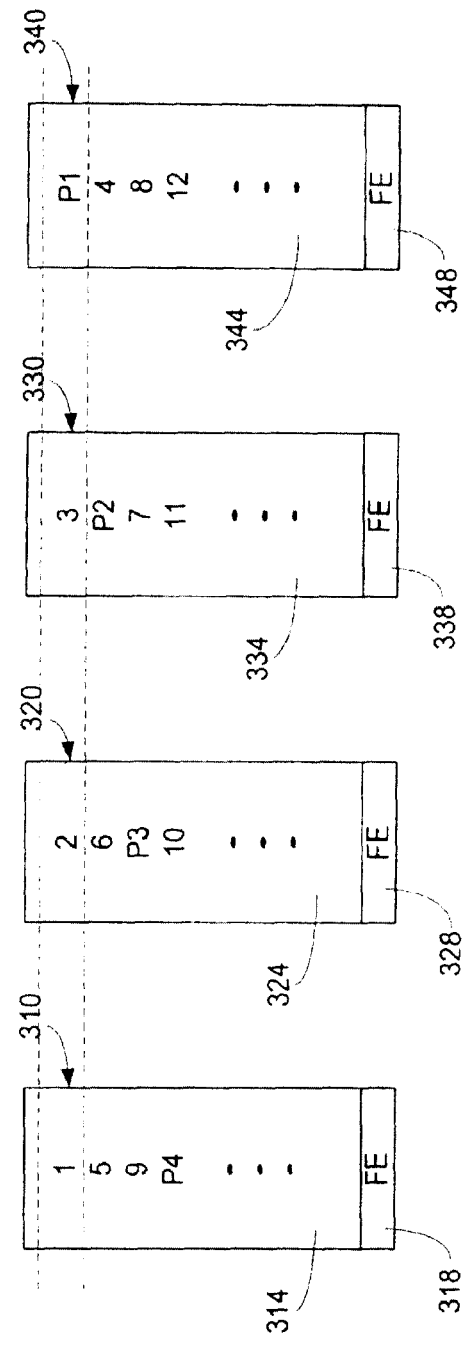

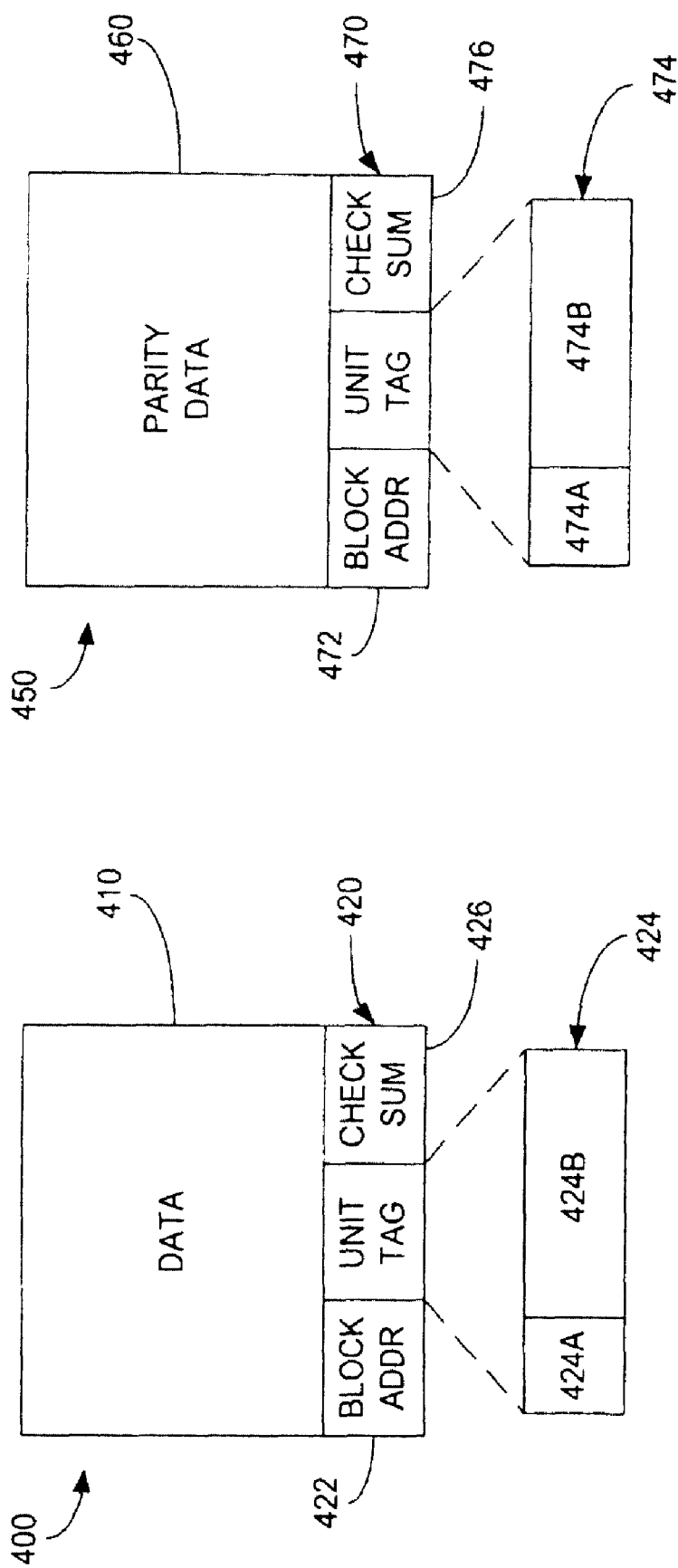

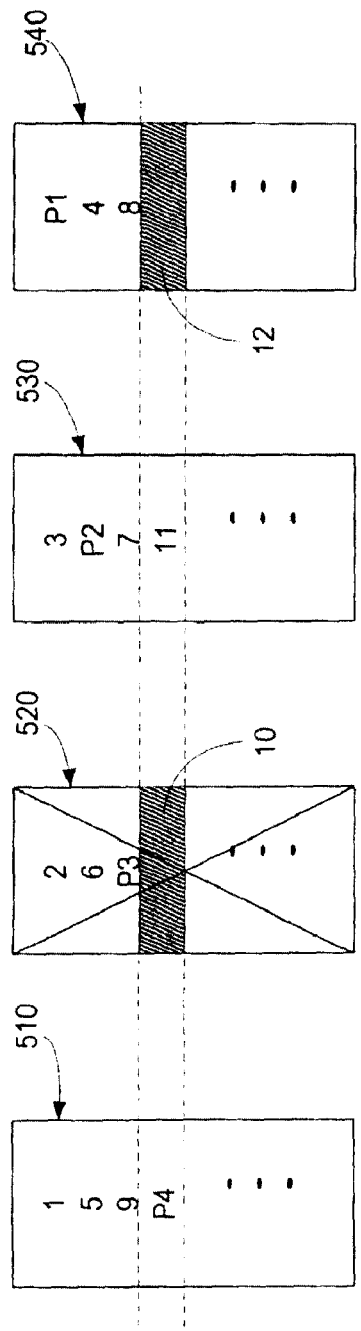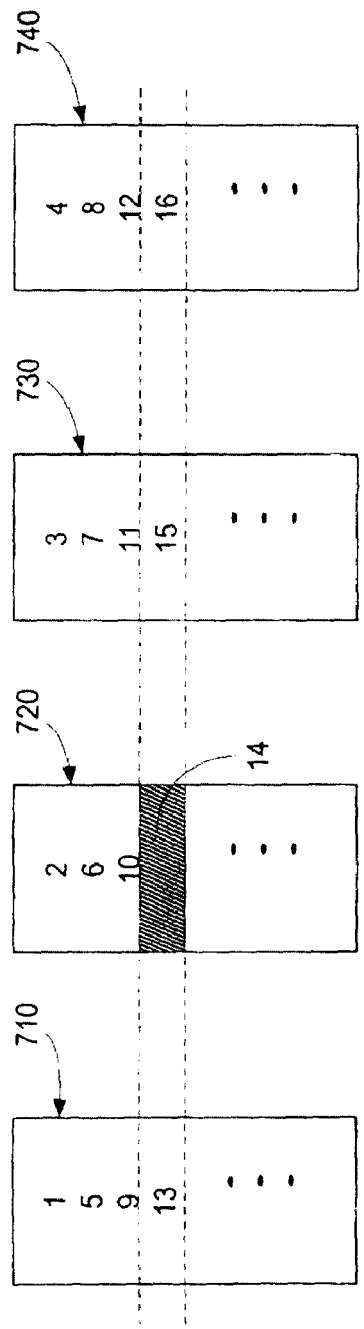

DATA RELIABILITY BIT STORAGE QUALIFIER AND LOGICAL UNIT METADATA

RELATED APPLICATIONS

This is a continuation application that claims the benefit of the earlier filing date of application Ser. No. 10/669,196.

FIELD

The present embodiments relate generally to storage systems. In particular, the present embodiments relate to RAID storage systems.

BACKGROUND

Disc drives are typically used in a stand-alone fashion, such as in a personal computer (PC) configuration where a single disc drive is utilized as the primary data storage peripheral. However, in applications requiring vast amounts of data storage capacity, data reliability or high input/output (I/O) bandwidth, a plurality of drives can be arranged into a multi-drive array, sometimes referred to as RAID ("Redundant Array of Inexpensive (or Independent) Discs").

One impetus behind the development of such multi-drive arrays is the disparity between central processing unit (CPU) speeds and disc drive I/O speeds. An array of smaller, inexpensive drives functioning as a single storage device will usually provide improved operational performance over a single, expensive drive.

SUMMARY

In some embodiments a method is provided that includes the steps of storing first metadata only at the same addressable storage location of a computer readable medium as that where associated first user data is stored, and after the storing first metadata step, satisfying a read request for the first user data by retrieving the first user data from the addressable location of the computer readable medium where the first metadata is stored if the first metadata has a first value, and by reconstructing the first user data from other metadata stored at another addressable location of the computer readable medium than where the first metadata is stored if the first metadata has a second value.

In some embodiments an apparatus is provided that has a computer readable medium having a plurality of addressable storage locations. The apparatus further has circuitry configured to store first metadata only at the same addressable storage location as that where associated first user data is stored, and after storing the first metadata satisfying a read request for the first user data by retrieving the first user data from the addressable location where the first metadata is stored if the first metadata has a first value and by deriving the first user data from other metadata stored at another addressable location than where the first metadata is stored if the first metadata has a second value.

In some embodiments a method is provided that includes the steps of storing first metadata only at the same addressable storage location of a computer readable medium as that where associated first user data is stored, and after the storing first metadata step, satisfying a read request for the first user data by retrieving the first user data from the addressable location of the computer readable medium where the first metadata is stored if the first metadata has a first value, and by regenerating the first user data from other metadata stored at another addressable location of the computer readable medium than where the first metadata is stored if the first metadata has a second value.

BRIEF DESCRIPTION OF THE DRAWINGS

FIGS. 3A and 3B show one method of storing block metadata.

FIGS. 4A and 4B show illustrative embodiments of the present invention.

FIGS. 5A-5C are used to explain a method of storing block metadata according to embodiments of the present invention.

FIG. 7 shows another use of embodiments of the present invention.

DETAILED DESCRIPTION OF ILLUSTRATIVE EMBODIMENTS

Figure 1:
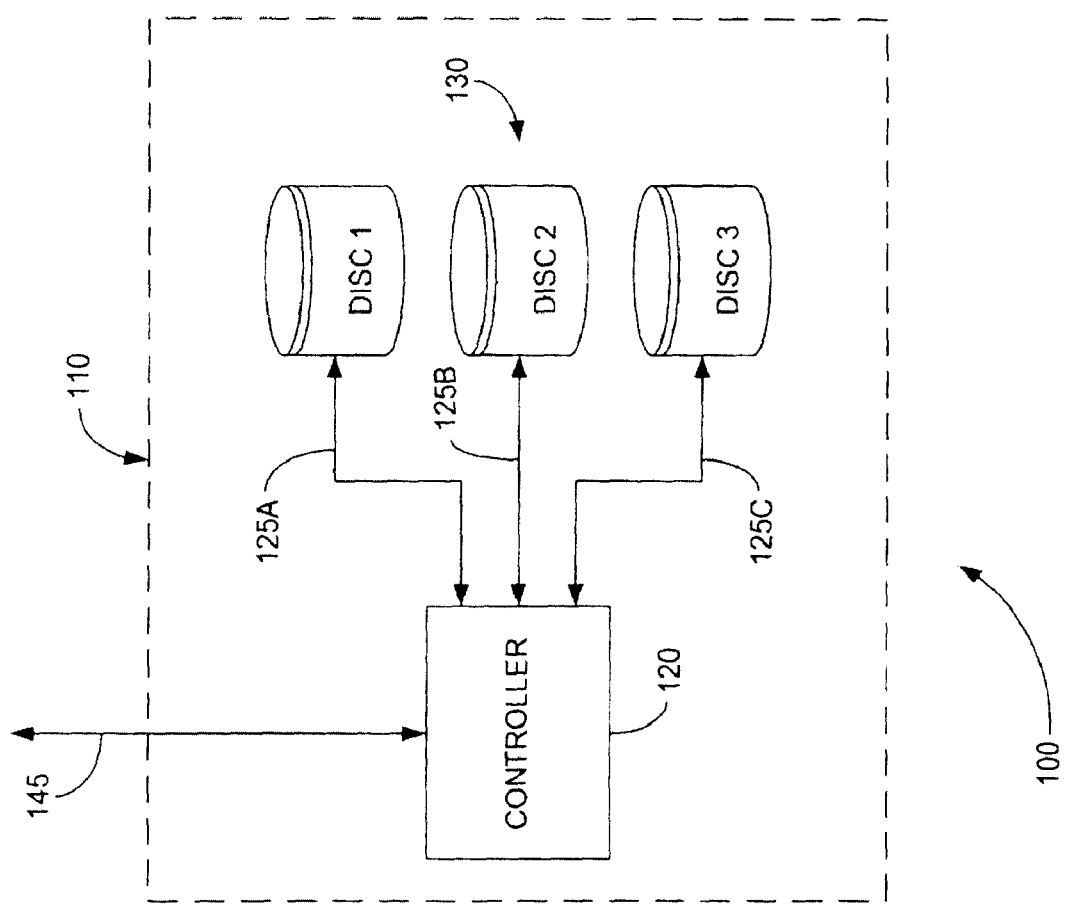
FIG. 1 is a block diagram of a storage system.

While embodiments of the present invention are susceptible of many different forms, there are shown in the drawings and are described below in detail specific embodiments of the invention with the understanding that the present disclosure is to be considered as an exemplification of the principles of the claimed invention and is not to be limited to the specific embodiments described and shown.

FIG. 1 is a block diagram of a storage system 100 that can incorporate embodiments of the present invention. Storage system 100 includes a disc array 110 that has a controller 120 and a disc array group 130. The controller 120 communicates via a bus 145 to an operating environment, such as a host computer or an area network (local, wide and storage). Controller 120 provides an array management function that includes presenting disc array group 130 as one or more virtual discs to the operating environment. Controller 120 can provide additional functions, such as capacity management, host communication, cache management and other functions common for such a storage system. Controller 120 communicates with each of discs 1, 2 and 3 by respective buses 125A, 125B and 125C.

Figure 2:
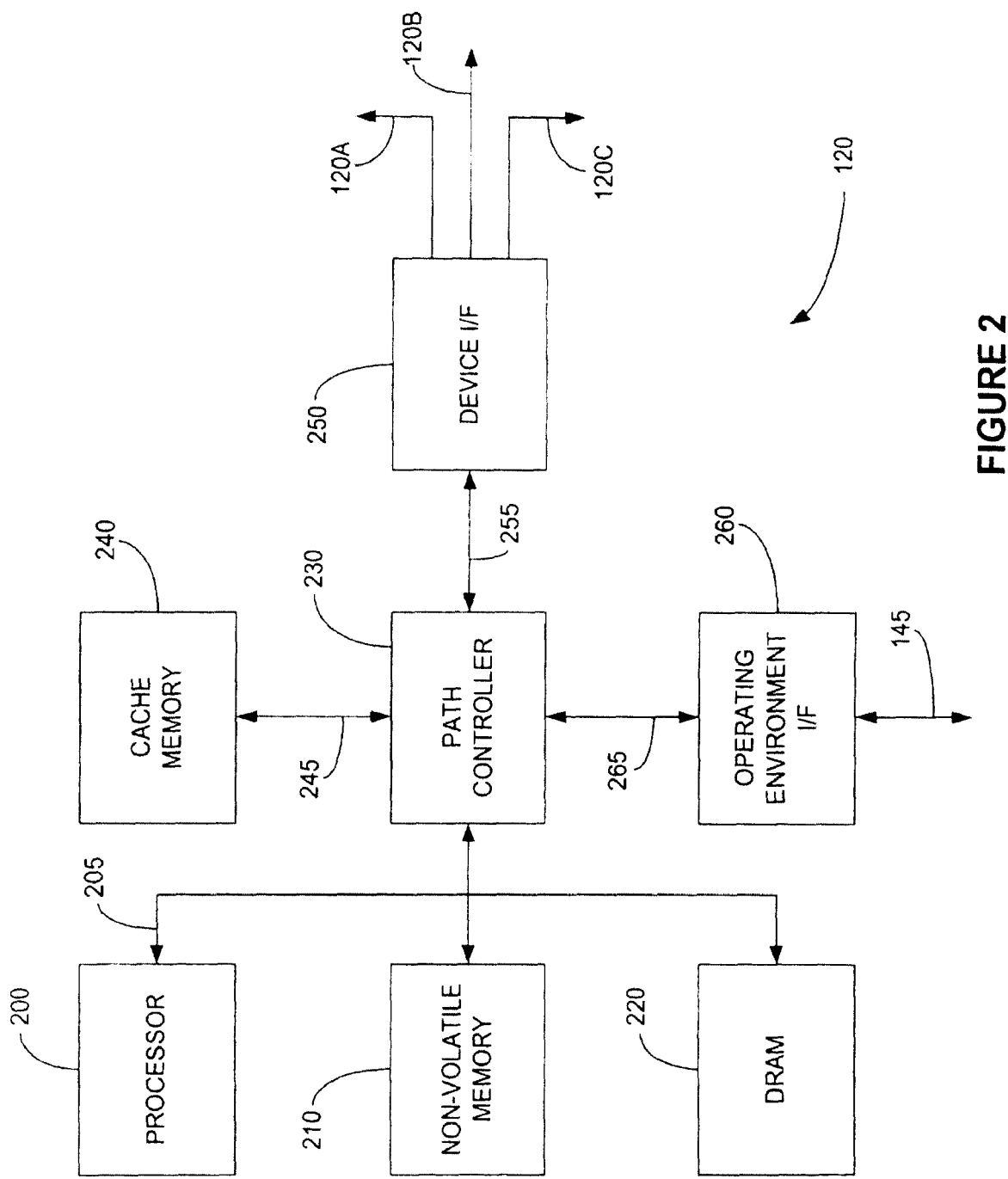
FIG. 2 is a block diagram of the controller shown in FIG. 1.

FIG. 2 shows a block diagram of controller 120. A bus 205 couples a processor 200, a non-volatile memory 210, a DRAM 220 and a path controller 230. Path controller 230 is coupled to a cache memory 240, a device interface 250 and an operating environment interface 260 by respective buses 245, 255 and 265. Device interface 250 is coupled to disc array group 130 by buses 125A, 125B and 125C. Operating environment interface 260 is coupled to the operating environment by bus 145. Controller 120 can be implemented as a single integrated circuit. One alternative is path controller 230, device interface 250 and operating environment interface 260 are a single integrated circuit, with the other blocks being separate integrated circuits. The present embodiments are not limited to the physical implementation of controller 120, nor are they limited to the blocks shown in FIG. 2 or the shown interconnection. Another controller 120 or portions of it can be used in storage system 100 to, among other reasons, provide additional redundancy.

As background, data are stored on a storage device such as a disc drive. The data may become corrupted because of physical defects on the media of the storage device. The data may also be corrupted for other reasons beside physically defective media. One example is when the data has been lost from a "write back" cache and which data was lost is known. Another example is when data cannot be reconstructed for an inoperative disk drive because the redundant copy is on physically defective media. In these cases, the data are not good or reliable even though the media where the data resides is not defective. Therefore, Data Reliability Qualifier (DRQ) bits are used to signal storage system 100 that the data are not reliable. The storage system then can force an error message to the operating environment when the data is accessed. For purposes of the present embodiments, data is used in a general sense to include actual user, system and operating environment data; system and operating environment information not generally available to a user; programs; etc.

FIG. 3A illustrates a disc array group 300 that is used in a RAID configuration. The disc array group 300 includes devices 310, 320, 330 and 340. The devices are preferred disc drives. Devices 310, 320, 330 and 340 store data blocks 1-12 in a RAID 5 configuration as shown. There are four RAID slivers illustrated, with one sliver illustrated as blocks 1, 2, 3 and P1. The data blocks are stored in respective portions 314, 324, 334 and 344 of devices 310, 320, 330 and 340. Portions 318, 328, 338 and 348 store metadata information about the data blocks. In particular, portions 318, 328, 338 and 348 store so-called "Forced Error" ("FE") bits. These FE-bits are used to signify if the data in the associated data blocks on the respective drives are unreliable. For example, an FE bit in portion 318 of drive 310 is associated with data block 1.

FIG. 3B shows an FE-bit table 350 that can be stored in the controller 120, specifically cache memory 240 in FIG. 2. In operation, controller 120 will access FE-bit table 350 when the operating environment requests access to the drive array group 300. In this way, controller 120 will know whether the data in the requested data block is unreliable. If an FE bit is set for an accessed data block, controller 120 will send an error message to the operating environment. When writing new data to a block designated as having unreliable data. controller 120 clears the corresponding FE-bit in FE-bit table 350, writes the data to the device and also writes the associated FE-bit stored on the device. However, storing the FE-bits independently on each device perturbs the use of storage space, particularly the distribution of parity and data in a RAID system with redundancy. Also, writing the data blocks and the FE-bits independently requires extra I/Os to the devices. Likewise, the FE-bit table 350 ultimately uses storage space on media or requires a system where power may never fail, and updating it independently requires additional overhead.

The present embodiments remove the need for the FE-bit table 350 and the portions 318, 328, 338 and 348 of devices 310, 320, 330 and 340 in FIG. 3A. Referring to FIG. 4A, a storage scheme of the present embodiments is illustrated. A data block 400 is shown that includes a data portion 410 and appended information 420. An example of appended information 420 is a "Data Integrity Field" ("DIF") that includes a "Reference Tag" ("REF TAG"), usually a "Virtual Block Address" ("VBA)" or a "Logical Block Address" ("LBA"), portion 422, a "Metadata Tag" ("META TAG"), usually a "Logical Unit ID" with other possible "metadata" flags, portion 424, and a check sum ("CHECK SUM") portion 426. Reference Tag portion 422 contains information that identifies the logical or virtual address for data portion 410. Check sum portion 426 contains information that is used to detect errors in data portion 410. Metadata Tag portion 424 contains additional portions 424A and 424B. Portion 424B can contain information about the device, such as a device identifier ("Logical Unit ID"). Portion 424A, according to the present embodiments, contains a "Data Reliability Qualifier" or DRQ-bit that qualifies not only the data in data portion 410 but all redundant copies of that data. The DRQ flag is logically appended to the contents of the data block and maintained with identical redundancy as the bits in the data portion. It should be viewed as a copy of "logical metadata" in the same sense as the data portion is considered a copy, with possible redundancy, of a "logical block" of a "logical unit" created using any of the techniques known as "virtualization". Portion 424A can contain additional metadata bits that qualify the data. Some of these bits may also be "logical metadata" and maintained with identical redundancy to the data bits. Some of these bits may be "physical metadata" and apply only to the particular copy to which they are appended. For example, portion 424A can contain a "Parity" flag bit, set to "0" (or "FALSE") for data blocks 400, that indicates that the block in question contains some form of parity for other user data blocks.

FIG. 4B shows a storage scheme for the parity data according to the present embodiments. A data parity block 450 includes a parity data portion 460 and appended information 470. Appended information 470 includes a "Reference Tag" ("REF TAG"), usually a "Parity Virtual Block Address" ("Parity VBA)"; portion 472, a "Metadata Tag" ("META TAG"), usually a "Logical Unit ID" with other possible "metadata" flags, portion 474 and a check sum ("CHECK SUM") portion 476. Reference Tag portion 472 when qualified by a "Parity" flag in Metadata Tag portion 474 contains information that identifies the so-called "sliver" for which parity data portion 460 provides redundancy. In particular, the "Parity Virtual Block. Address" in the DIF of the parity block may specify the "Virtual Block Address" ("VBA") of the data block with the lowest such address of the RAID "sliver" (where address in this context means address in the virtual unit). Check sum portion 476 contains information that is used to detect errors in parity data portion 460. Metadata Tag portion 474 contains additional portions 474A and 474B. Portion 474B can contain information about the device, such as a device identifier ("Logical Unit ID"). Portion 474A, according to the present embodiments, can contain a bit that is a function of the other DRQ-bits in portions 424A. The DRQ parity bit can be generated by an exclusive-OR function of all the other data block DRQ-bits. To illustrate, the 1-bit portions 424A can be exclusive-ORed together to generate the single DRQ parity bit that will saved in portion 474A. Generally, then, the DRQ parity bit is created as a function of the other DRQ bits in portions 424A in the same sliver.

As is apparent, the present embodiments have several advantages over the scheme described in FIGS. 3A and 3B. First, the additional accessing of a device to write FE-bit information is not required since the separate FE-bit portions 318, 328, 338 and 348 are eliminated. Furthermore, the need to store the FE-bit table is eliminated. Since the FE-bit table maintenance can consume a substantial amount of processing overhead, such elimination will save critical path CPU cycles. Also, considering that the DRQ bit is automatically retrieved when the data is, there is no real performance degradation to check for it being set, which it usually is not.

Figure 5A:
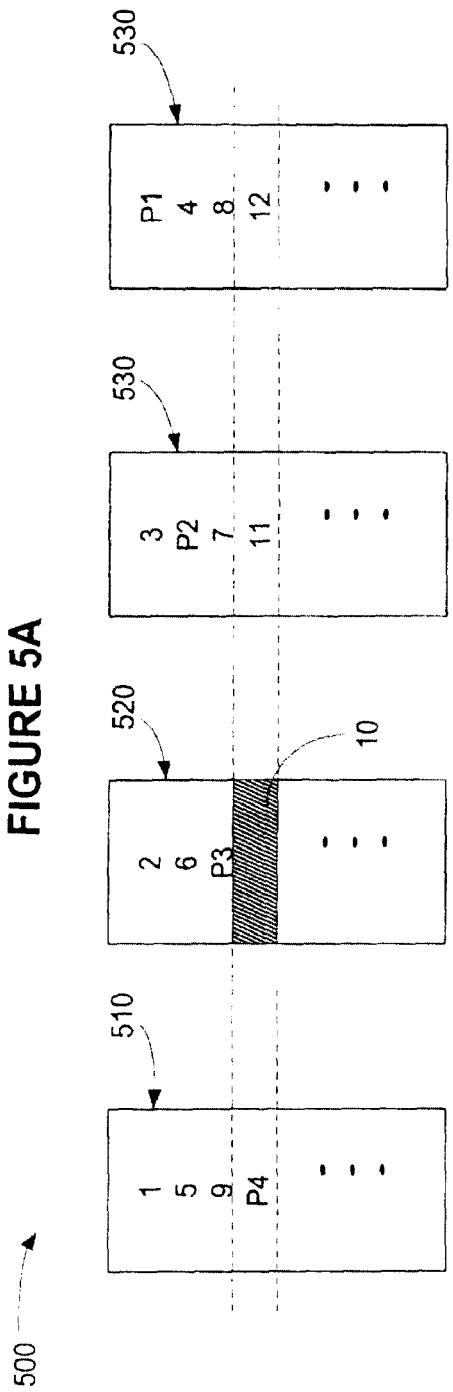

One use of the present embodiments will be described with reference to FIGS. 5A-5C. In FIG. 5A, data block 10 is illustrated as unreliable. According to the present embodiments, the associated DRQ bit is set and exclusive-ORed with the other DRQ bits stored in portions 424A and stored in portion 474A of the parity block P4 stored on device 510. When the data block 10 is subsequently read, the DRQ bit set in portion 424A can be used to indicate its unreliability. Any attempt to reconstruct data block 10 will also reconstruct the DRQ bit in portion 424A since the DRQ parity bit in portion 474A along with the DRQ bits in the other data blocks 424A allows this reconstruction using the standard exclusive-OR mechanism.

Figure 5B:
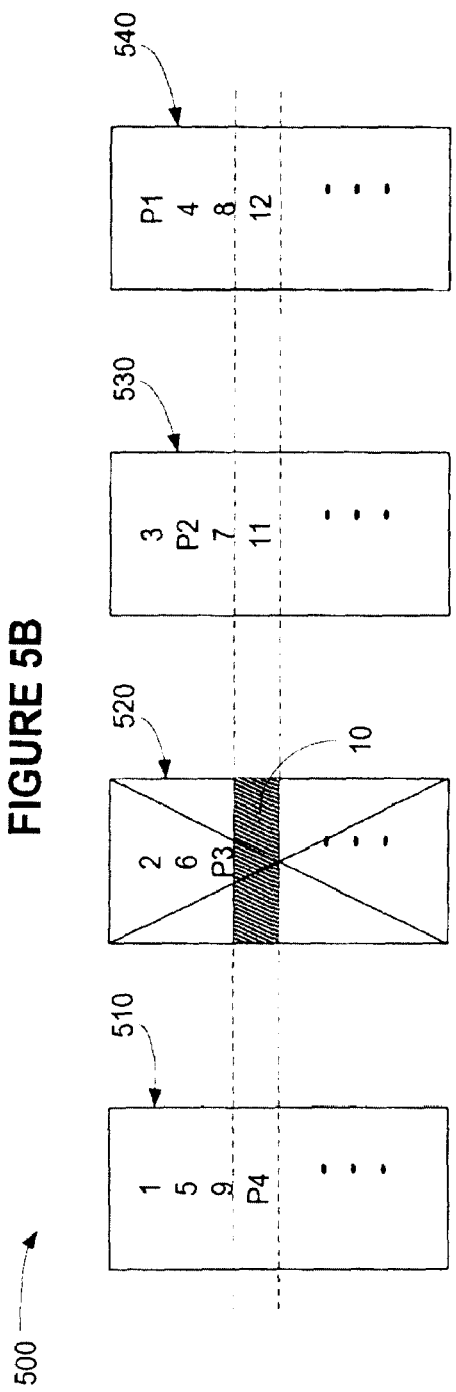

FIG. 5B shows the situation where device 520 that stores block 10 is "missing." In that case, a regeneration of data block 10 can be performed but the fact the data is unreliable will be retained via the regeneration of the associated DRQ bit because the associated DRQ parity bit information in portion 474A of the parity block P4 when combined with the DRQ bits of the other data block portions 424 indicates the data of data block 10 is unreliable. That is, the regenerated DRQ bit for data block 10 will be "1" (or "TRUE").

FIG. 5C shows another situation in which the present embodiments are particularly useful. In that figure, data block 10 is shown as unreliable as well as "missing" (as are all blocks on device 520) and data block 12 is also shown as unreliable. If an attempt to regenerate data block 10 is made, the regeneration will succeed but the regenerated data will still be shown as unreliable because the parity DRQ bit in portion 474A of parity data block P4 when combined with other DRQ bits in portions 424A including the DRQ bit in data block 12 showing it as unreliable will produce a DRQ bit for data block 10 that is "1" ("TRUE"). Like data block 10, the DRQ bit associated with data block 12 is saved to portion 424A of data block 12 and combined with the other DRQ bits for data block portions 424 to produce the parity DRQ bit in portion 474A of parity data block P4.

Figure 6A:
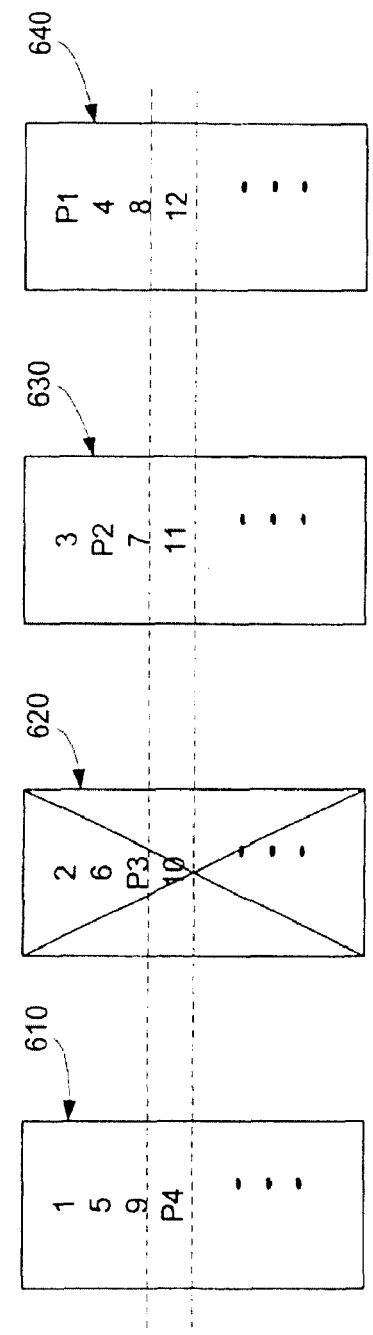
FIGS. 6A and 6B are used to explain another method of storing block metadata according to embodiments of the present invention.

Another use of the present embodiments will be explained with reference to FIGS. 6A and 6B. FIG. 6A exemplifies when a device 620 is inoperative or "missing" in a disk array group 600. If a read request is made that resolves to device 620, the storage system controller receives data blocks P4, 11 and 12 from respective devices 610, 630 and 640. The controller will perform error detection of each block to ensure that the data is "good" (reliable from the point of view of the drive). If the data is "good", the storage system controller will exclusive-OR the parity data P4 in device 610 with data blocks 11 and 12 in respective devices 630 and 640. The result will be the regeneration of data block 10 that was stored on device 620. For a write to inoperative device 620, data blocks 11 and 12 in respective devices 630 and 640 will be exclusive-ORed with the new data. The result is new parity data that will be saved in the location of parity data block P4 in device 610. The new parity data block will have associated information data that includes a parity DRQ bit that is the exclusive-OR of the DRQ bits associated with data blocks 11 and 12 and the DRQ bit for data block 10 itself, which may or may not be "0" at the discretion of the issuer of the write.

Figure 6B:
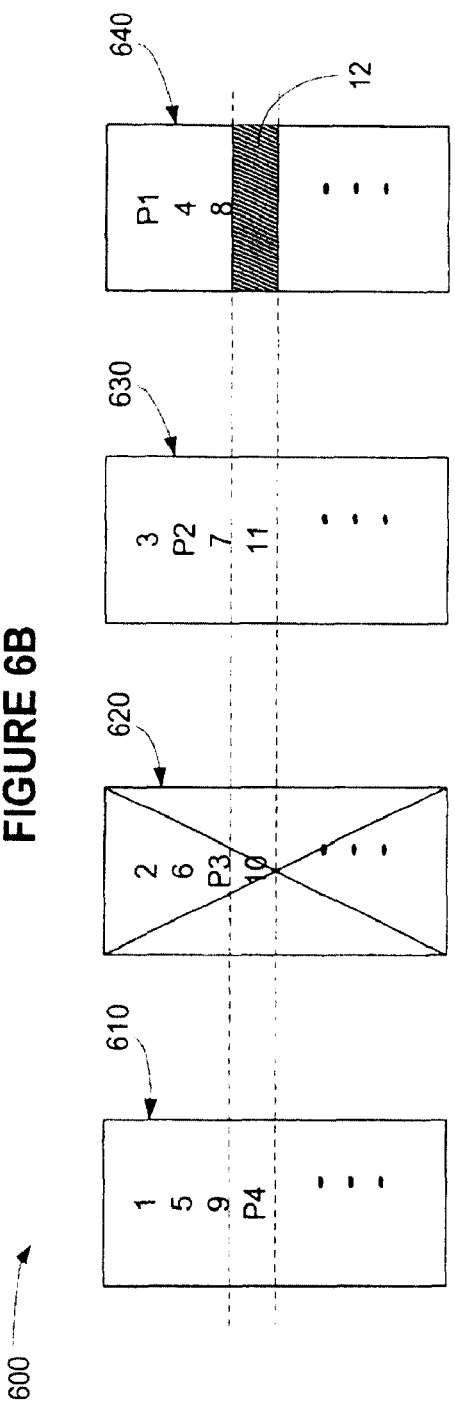

FIG. 6B shows when device 620 is inoperative and data block 12 of device 640 is unreliable. As described above, if a read request is made that accesses inoperative device 620, the storage system controller receives data blocks P4, 11 and 12 from respective devices 610, 630 and 640. The controller will perform error detection of each block to ensure that the data is "good". If any of the data is not "good", then the controller informs the host environment that the read cannot be performed. Otherwise, the data block 10 is regenerated as well as its associated DRQ bit. If the regenerated DRQ bit indicates the data is reliable, then the read can succeed. The use of the data in data block 12 for regeneration is independent of the quality of that data at the "logical block" level. If the device declares it as being "good", then it can be used for regeneration as shown in this case.

With further reference to FIG. 6B, writing data will be explained. In the case where data is to be written to block 10 of missing device 620 and block 12 of device 640 is unreadable (not "good"), the data in block 10 cannot be "stored in the parity data" in block P4 of device 610 because block 12 is unreadable. That is, the data in block 10 would normally be "stored" by generating a new parity block that is the exclusive-OR of the data in block 10 that is being written and the data in blocks 11 and 12. Normally, this situation results in a block that cannot be written. The data in block 12, however, can be made "good" by writing it with either "best guess" data or some pattern. The DRQ bit in the associated information data for block 12 will be set to "1" to remember that the data in block 12 is "unreliable". Now the data in block 10 can be "stored in the parity" because the data in block 12 has been "made good." The parity DRQ bit associated with parity block P4 will be generated using exclusive-OR from the new DRQ bit for data block 10, the existing DRQ bit for data block 11 and the set DRQ bit that represents the data in block 12 as unreliable.

FIG. 7 shows another use of the present embodiments. Shown is an array 700 that includes devices 710, 720, 730 and 740 configured as RAID 0. In other words, the data is striped but there is no parity. As such, the data is not recoverable. In the case where data block 14 (shown as the striped-out data block to in device 720) is unreadable (not "good"), the data block is made readable again by either writing a "best guess" of the data in data block 14, or a pattern. Such a pattern can be all zeros. However, the data in data block 14 cannot be trusted and is, therefore, "unreliable." So the associated DRQ bit is set to indicate that the data in data block 14 is not trustworthy. The "Data Reliability Qualifier" should be understood as "logical metadata" associated with "logical blocks" even for RAID-0, where there is no redundancy.

In another use of the present embodiments, when the controller receives a write long command from the host, the data does not pass through to a drive in the array. Instead, the command is converted to a regular write command, and the 'extra' bytes (one or two, depending upon what is supported) are stripped off. The extra bytes are treated in a binary fashion—if they are zero, the DRQ bit is assumed a "0". If they are non-zero, the DRQ bit is assumed "1" or set. Preferably, there is no effect on the actual sector ECC in this implementation.

Present embodiments eliminate separate FE bit table lookup and I/Os to determine the reliability of a particular piece of data by embedding the DRQ information with the data. The equivalent to the FE bit table information exists, but in a different form—it is distributed or embedded with the data, and its redundancy and distribution is the same as that of the data. This allows the minimization of the performance overhead associated with determining the data reliability. It also allows elimination of the storage mapping complexity (both on disk and in controller memory) associated with a separate FE bit table when compared to other DIF-enabled systems. The DRQ bit has the same redundancy as the data, achieved by using the same parity algorithm on the DRQ hit as on the data.

Several variations and modifications exist for the present embodiments. Although the preferred embodiments described herein are directed to a disk RAID storage system, it will be appreciated by those skilled in the art that the teachings of the present embodiments can be applied to other systems. For example, the storage devices can be magnetic, optical, tape, solid state, a SAN or JBOD, or a combination of two or more of them. Further, the present embodiments may be implemented in hardware, software or a combination of both. Also, a storage area includes without limitation a portion of a single surface of a storage medium, a surface of the storage medium, the entire storage medium, a device containing at least one storage medium and a system containing at least one device.

And although the DRQ bits are disclosed as part of a "Data Integrity Field," the DRQ bit does not have to be contained like that. The DRQ bit can simply be appended (or prepended) to the data, or part of other data appended to the data. This eliminates the case where the data reliability information becomes unavailable, while the data is available (which could certainly happen with a separate FE-bit table), thus having no way to figure out which data is reliable and which is not. With these embodiments, if the data is available, then the data reliability information is available, and the data's reliability can always be determined. Generally, the present embodiments accompany data with reliability information, such as (without limitation) appending or embedding. The mechanism proposed for the specific "Data Reliability Qualifier" (DRQ) can be extended to incorporate other "logical metadata" which qualifies the data.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts and values for the described variables, within the principles of the present embodiments to the full extent indicated by the broad general meaning of the terms in which the appended claims are expressed.

What is claimed is:

1. A method comprising:
   storing first metadata only at the same addressable storage location of a computer readable medium as that where associated user data is physically stored, the user data associated with redundant user data stored at another addressable storage location according to a prescribed redundancy format, and the first metadata logically appended to the user data according to the prescribed redundancy format; and
   after the storing first metadata feature, satisfying a read request for the user data by retrieving the user data from the addressable location of the computer readable medium where the first metadata is stored if the first metadata has a first value, and by reconstructing the user data from data stored at the another addressable storage location if the first metadata has a second value.

2. The method of claim 1 wherein the first metadata indicates a reliability of the user data.

3. The method of claim 1 wherein the first metadata is a data reliability qualifier bit.

4. The method of claim 1 wherein the first metadata is embedded with the user data.

5. The method of claim 1 wherein the first metadata is appended with the user data.

6. The method of claim 1 further comprising storing second metadata only at the another addressable location where the redundant user data is stored, the second metadata indicating the status of the user data.

7. The method of claim 6 wherein the second metadata indicates that the user data is unreliable.

8. An apparatus comprising:
   a computer readable medium having a plurality of addressable storage locations; and
   circuitry configured to store first metadata only at the same addressable storage location as that where associated user data is physically stored, the user data associated with redundant user data stored at another addressable storage location, the first metadata having a data qualifier that qualifies the user data and the redundant user data, and after storing the first metadata satisfying a read request for the user data by retrieving the user data from the addressable location where the first metadata is physically stored if the first metadata has a first value and by deriving the user data from other data stored at the another addressable storage location than where the first metadata is stored if the first metadata has a second value.

9. The apparatus of claim 8 wherein the circuitry includes a controller that operably stores the first metadata with the user data.

10. The apparatus of claim 8 comprising second metadata stored at the another addressable storage location indicating a status of the user data.

11. The apparatus of claim 10 wherein the addressable storage locations are in a RAID configuration.

12. The apparatus of claim 8 wherein the first metadata is appended to the user data.

13. The apparatus of claim 8 wherein the first metadata is embedded in the user data.

14. The apparatus of claim 8 wherein the first metadata and the user data are generated by the same function.

15. A method comprising:
   storing first metadata only at the same addressable storage location of a computer readable medium as that where associated user data is stored;
   storing second metadata only at another addressable location where associated redundant user data is stored, the second metadata indicating the status of the user data; and
   after the storing first metadata and the storing the second metadata steps, satisfying a read request for the user data by retrieving the user data from the addressable location of the computer readable medium where the first metadata is stored if the first metadata has a first value, and by regenerating the user data from data stored at the another addressable location if the first metadata has a second value.

16. The method of claim 15 wherein the first metadata indicates a reliability of the user data.

17. The method of claim 15 wherein the first metadata is a data reliability qualifier bit.

18. The method of claim 15 wherein the first metadata is embedded with the user data.

19. The method of claim 15 wherein the first metadata is appended with the user data.

20. The method of claim 15 wherein the second metadata indicates that the user data is unreliable.

* * * * *